Nov. 14, 1967   D. B. PECK ET AL   3,353,072
ALUMINUM ELECTROLYTIC CAPACITOR ENCASED
IN POLYVINYLALCOHOL-BORATE FILM
Filed March 16, 1965
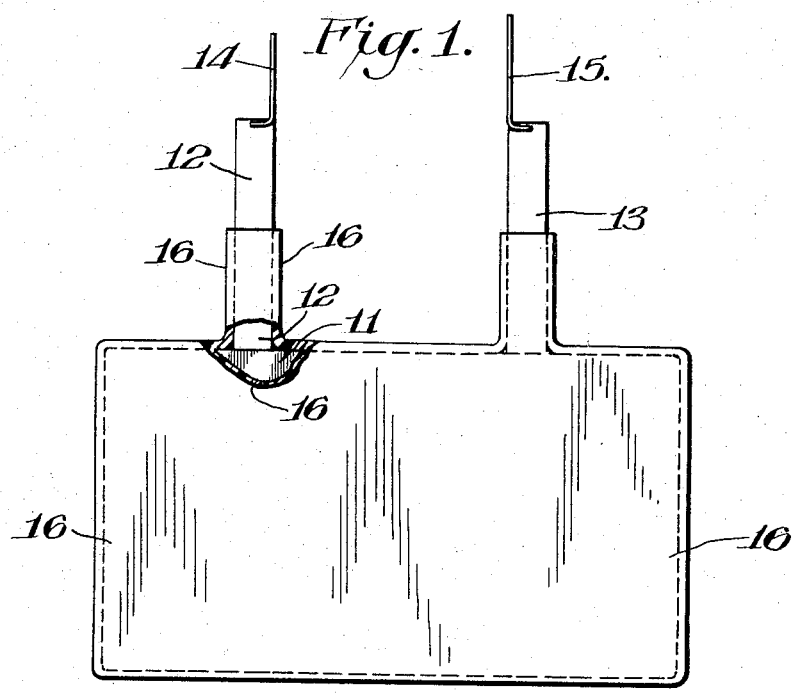
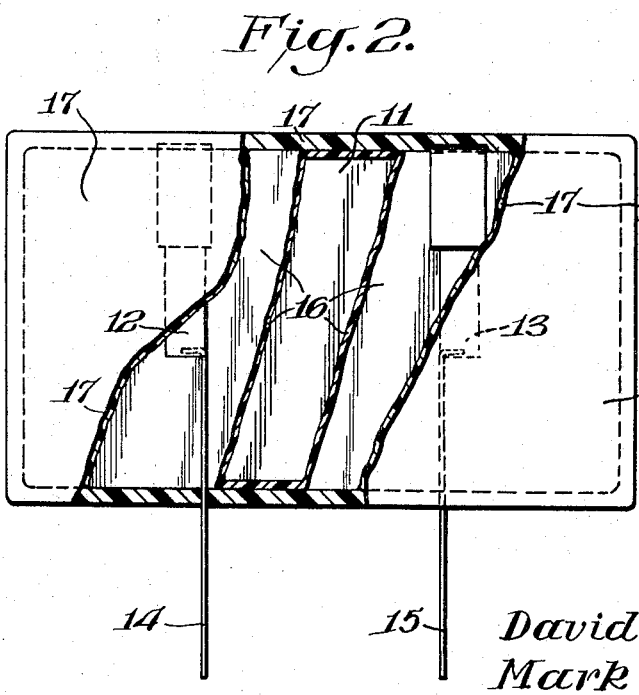
INVENTORS
David B. Peck &
Mark Markarian
BY Connolly and Hutz
ATTORNEYS : 3,353,072
ALUMINUM ELECTROLYTIC CAPACITOR ENCASED IN POLYVINYLALCOHOL-BORATE FILM
David B. Peck and Mark Markarian, Williamstown, Mass., assignors to Sprague Electric Company, North Adams, Mass., a corporation of Massachusetts
Filed Mar. 16, 1965, Ser. No. 440,141
7 Claims. (Cl. 317—230)

ABSTRACT OF THE DISCLOSURE

An electrolytic capacitance section of aluminum foils separated by spacer material is impregnated with an electrolyte containing a borate ionogen. Leakage of electrolyte from the capacitance section is prevented by coating the section with a film which is the reaction product of borate ions from the electrolyte and polyvinylalcohol.

This invention relates to aluminum electrolytic capacitors, and more particularly to a unique encapsulated electrolytic capacitor.

Attempts to package and protect aluminum electrolytic capacitors by molding, resin coating, or encapsulating via potting into a premold shell have left much to be desired. The leakage of electrolyte through the molding or encapsulating resin causes an increase in power factor, a decrease in capacitance, and corrosive destruction of the weld joint between the anode electrode tab and the anode lead. Furthermore, the exuded electrolyte presents the danger of damage to other components in a circuit.

It is an object of the present invention to overcome the foregoing and related disadvantages.

A further object is to present an encapsulated electrolytic capacitor free from electrolyte leakage.

Other objects and advantages of the present invention will be made obvious to those skilled in the art by the following description when considered in relation to the accompanying drawing of which:

FIGURE 1 is a side view of a partially completed capacitor within the scope of the present invention.

FIGURE 2 is a side view, partly broken away, of a completed capacitor of the present invention.

In accordance with the present invention, the foregoing objects are attained by producing a capacitor comprising an electrolytic capacitance section of convolutely wound aluminum foil electrodes separated by a porous spacer. Electrode tabs are affixed to said electrodes so as to extend from said section and leads are contacted to said tabs. The section is impregnated with an electrolyte containing a borate ionogen. A film comprising the reaction product of polyvinylalcohol (PVA) and the borate electrolyte completely envelopes the section and extends to a point on the tabs short of the tab-lead connection. The tabs are confined against the body of the film-enveloped capacitance section by an overcoat of a resin which completely encapsulates the unit.

Referring to the drawing, FIGURE 1 shows a capacitance section 11 having electrode tabs 12 and 13 extending therefrom. Lead wires 14 and 15 are affixed to said tabs. A film 16 comprising the reaction product of polyvinylalcohol and the borate electrolyte of the capacitor envelopes said section 11 and extends to a point on said tabs short of the tab-lead connection.

FIGURE 2 shows the unit of FIGURE 1 with the tabs 12 and 13 confined against film-enveloped capacitance section 11 by an overcoat 17 of a resin which completely encapsulates the unit.

Example

Twenty capacitors were wound with 3 mil etched aluminum anode foils (formed to 15 v. DC); 3 mil etched aluminum foils and 1 mil linen paper, the latter being ⅛″ wider than the electrodes. Aluminum electrode tabs extend from each capacitor section and terminal wires are welded to the tabs.

The capacitors were vacuum impregnated with an electrolyte comprising 3 parts ammonium pentaborate reacted at 90° C. with 7 parts ethylene glycol until the resistivity measured 150 ohm centimeters. After removing the excess surface electrolyte, half of the capacitors were dipped in a 5% by weight solution of polyvinylalcohol (Du Pont Elvanol 51–05) and air-dried for 2 hours at 25° C.

The capacitors were dipped in an uncured filled epoxy coating resin of the following composition:

| | Percent |
|---|---|
| Shell resin (epoxy) #815 | 76 |
| Bentone | 4 |
| Yellow pigment | 2 |
| Hardener Z | 15 |
| Titanium dioxide | 3 |
| | 100 |

After curing the resin at 65° C.–10 v. DC for three hours, the capacitors had the following average characteristics:

| | No PVA Dip | With PVA Dip |
|---|---|---|
| Capacitance, mfd | 13.13 | 16.00 |
| Percent D.F. (120 v.) | 25.1 | 11.78 |
| Leakage Current, μa | <0.1 | <0.1 |

The higher dissipation factor and lower capacitance is evidence of the loss of moisture and/or electrolyte in the units not provided with the reaction product coating of polyvinylalcohol and the borate electrolyte. The epoxy coating was also cracked and displayed evidence of electrolyte leakage on 3% of the 10 unprotected units (after aging).

Homogeneous mixtures of water and polyvinylalcohol can be made in all proportions from dilute solutions to the comparatively concentrated. Solubility characteristics vary widely with the percent hydrolysis of the PVA. Either the completely or partially hydrolyzed grades of PVA may be employed. The partially hydrolyzed grade extends from about 87% up to 100% hydrolysis. An appropriate concentration is 15 parts by weight PVA to 85 parts by weight water. This is not critical and can vary between rather wide limits. When the electrolyte impregnated capacitor section contacts the PVA solution, an immediate reaction occurs between the PVA and the borate ions of the electrolyte, causing a coagulated and gelatinous deposit which, upon drying, becomes quite impervious to the transmission of moisture or electrolyte.

The film resulting from the reaction between PVA and the electrolyte has been referred to as a "reaction product" because of the impossibility of accurately identifying the product by its chemical formula.

The electrolyte contemplated herein can be any of the prior art borate-containing electrolytes, including organic as well as inorganic borates. The electrolyte solvent is not limited to ethylene glycol, but can be any solvent effecting the proper degree of ionization. The coating resin is not limited to an epoxy, but can be any compatible proprietary resin composition.

Since it is obvious that many changes and modifications can be made in the above described details without departing from the nature and spirit of the invention, it is to be understood that the invention is not limited to said details except as set forth in the appended claims.

What is claimed is:

1. An aluminum electrolytic capacitor comprising a section including at least a pair of convolutely wound aluminum foil electrodes and inert spacers of porous insulating material separating said electrodes, at least one of said electrodes having an anodic dielectric film on its surface, electrical connections affixed to the electrodes and extending from said section, an electrolyte containing a borate ionogen impregnating said section, and an impervious film comprising the reaction product of the borate electroylte and polyvinylalcohol disposed on the surface of and sealingly enveloping said section.

2. The aluminum electrolytic capacitor of claim 1 wherein said electrical connections include a tab affixed to each of said electrodes and extending from said section and a lead joined to each tab and extending therebeyond, and wherein said film envelopes each tab to a point short of each tab-to-lead joint.

3. The capacitor of claim 1 wherein said electrolyte is an ammonium pentaborate-ethylene glycol electrolyte.

4. An aluminum electrolytic capacitor comprising a section including at least a pair of convolutely wound aluminum foil electrodes and inert spacers of porous insulating material separating said electrodes, at least one of said electrodes having an anodic dielectric film on its surface, a tab affixed to each of said electrodes and extending from said section, a lead joined to each tab and extending therebeyond, an electrolyte containing a borate ionogen impregnating said section, and an impervious film comprising the reaction product of the borate electrolyte and polyvinylalcohol disposed on the surface of and sealingly enveloping said section, said film extending to a point on said tabs short of the tab-to-lead joint, said tabs being confined against said section by an overcoat of a resin completely encapsulating said section and said tabs, said overcoat extending to a point on said leads beyond the tab-to-lead joint.

5. The aluminum electrolytic capacitor of claim 4 wherein said resin is an epoxy resin.

6. A method of making an aluminum electrolytic capacitor comprising the steps of convolutely winding an assembly of a pair of aluminum foil electrodes separated by porous insulating material, providing an anodic dielectric film on the surface of at least one of said electrodes, making electrical connections to said electrodes, impregnating said assembly with an electrolyte containing a borate ionogen, immersing said assembly in a solution of polyvinylalcohol, and removing said assembly from said solution after a reaction product film of polyvinylalcohol and borate ions from the electrolyte has been formed about said assembly.

7. A method of making an aluminum electrolytic capacitor comprising the steps of convolutely winding an assembly of a pair of aluminum foil electrodes separated by porous insulating material, providing an anodic dielectric film on the surface of at least one of said electrodes, connecting a tab to each of said electrodes and connecting a lead to each tab, impregnating said assembly with an electrolyte containing a borate ionogen, immersing said assembly in a solution of polyvinylalcohol to a point short of the connection between the lead and tab, and removing said assembly from said solution after a reaction product film of polyvinylalcohol and borate ions from the electrolyte has been formed about the assembly and tabs, confining the tabs against the assembly, and encapsulating said assembly and tabs in a resinous material with the leads extending therefrom.

References Cited

UNITED STATES PATENTS

| | | | |
|---|---|---|---|
| 2,146,029 | 2/1939 | Schimkus | 317—230 |
| 2,869,052 | 1/1959 | Ness et al. | 317—230 |

FOREIGN PATENTS

| | | |
|---|---|---|
| 377,388 | 11/1938 | Canada. |
| 415,137 | 9/1943 | Canada. |
| 618,581 | 4/1961 | Canada. |

JAMES D. KALLAM, *Primary Examiner.*